United States Patent [19]
Huang

[11] Patent Number: 5,311,475
[45] Date of Patent: May 10, 1994

[54] HIGH SPEED FULL AND EMPTY FLAG GENERATORS FOR FIRST-IN FIRST-OUT MEMORY

[75] Inventor: Samson X. Huang, Sunnyvale, Calif.

[73] Assignee: Quality Semiconductor Inc., Santa Clara, Calif.

[21] Appl. No.: 692,012

[22] Filed: Apr. 26, 1991

[51] Int. Cl.⁵ ............................................. G11C 7/00
[52] U.S. Cl. .............................. 365/221; 365/189.01; 365/189.07
[58] Field of Search ................. 365/189.01, 189.07, 365/221

[56] References Cited

U.S. PATENT DOCUMENTS

| | | | |
|---|---|---|---|
| 4,030,077 | 6/1977 | Florence et al. | 340/172.5 |
| 4,486,854 | 12/1984 | Yuni | 364/900 |
| 4,864,543 | 9/1989 | Ward et al. | 365/221 |
| 4,888,739 | 12/1989 | Frederick et al. | 365/221 |
| 4,891,788 | 1/1990 | Kreifels | 365/49 |
| 5,027,326 | 6/1991 | Jones | 365/221 |
| 5,027,330 | 6/1991 | Miller | 365/239 |
| 5,084,841 | 1/1992 | Williams et al. | 365/189.07 |
| 5,121,346 | 6/1992 | McClure | 365/189.01 |

*Primary Examiner*—William L. Sikes
*Assistant Examiner*—Trong Phan
*Attorney, Agent, or Firm*—Majestic, Parsons, Siebert & Hsue

[57] ABSTRACT

A read signal and write signal for a FIFO each has a flag generating edge and a preceding edge. The read or write counter in an empty of full flag generator responds to the preceding edge of the read or write signal so that the empty or full comparator of the generator may generate an updated empty or full flag value before the onset of the flag generating edge. The empty or full flag generator also includes a gate and a pulse generating circuit. The pulse generating circuit responds to the flag generating edge by generating an enabling signal enabling the gate to pass the comparator output to a latch. When the empty or full comparator indicates that a FIFO is empty or full, the comparator output passed by the gate will force the output high, thereby asserting an empty flag or a full flag. The empty flag generator also includes a second pulse generating circuit which updates the empty flag signal to indicate a non-empty FIFO in response to each write signal. The full flag generator also includes a second pulse generating circuit which updates the full flag signal to indicate a non-full FIFO in response to each read signal.

13 Claims, 5 Drawing Sheets

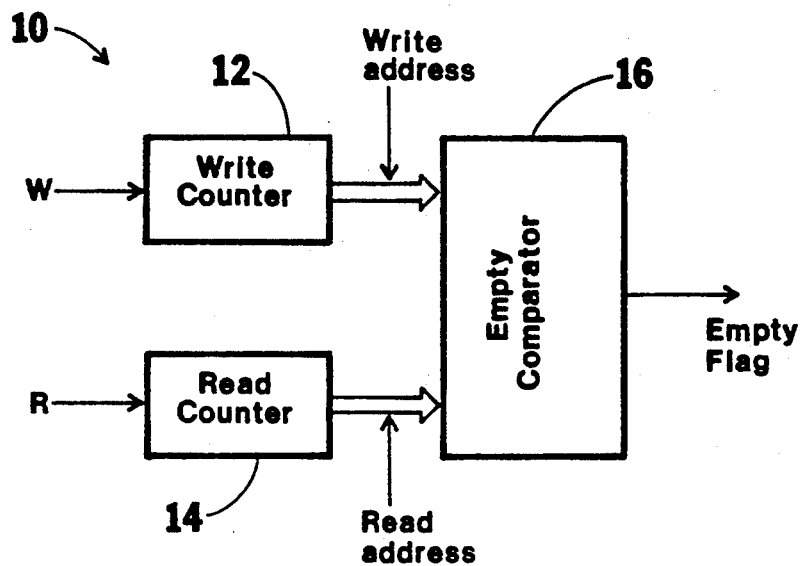
Fig._1(a).
Prior Art
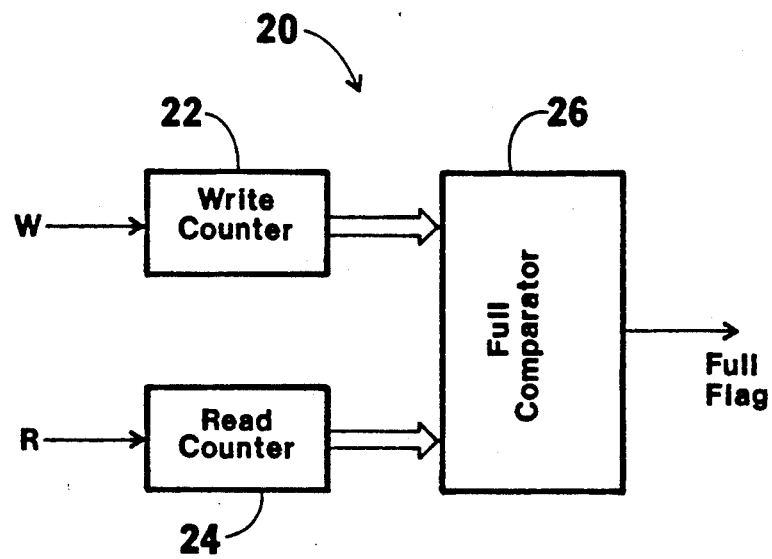
Fig._1(b).
Prior Art

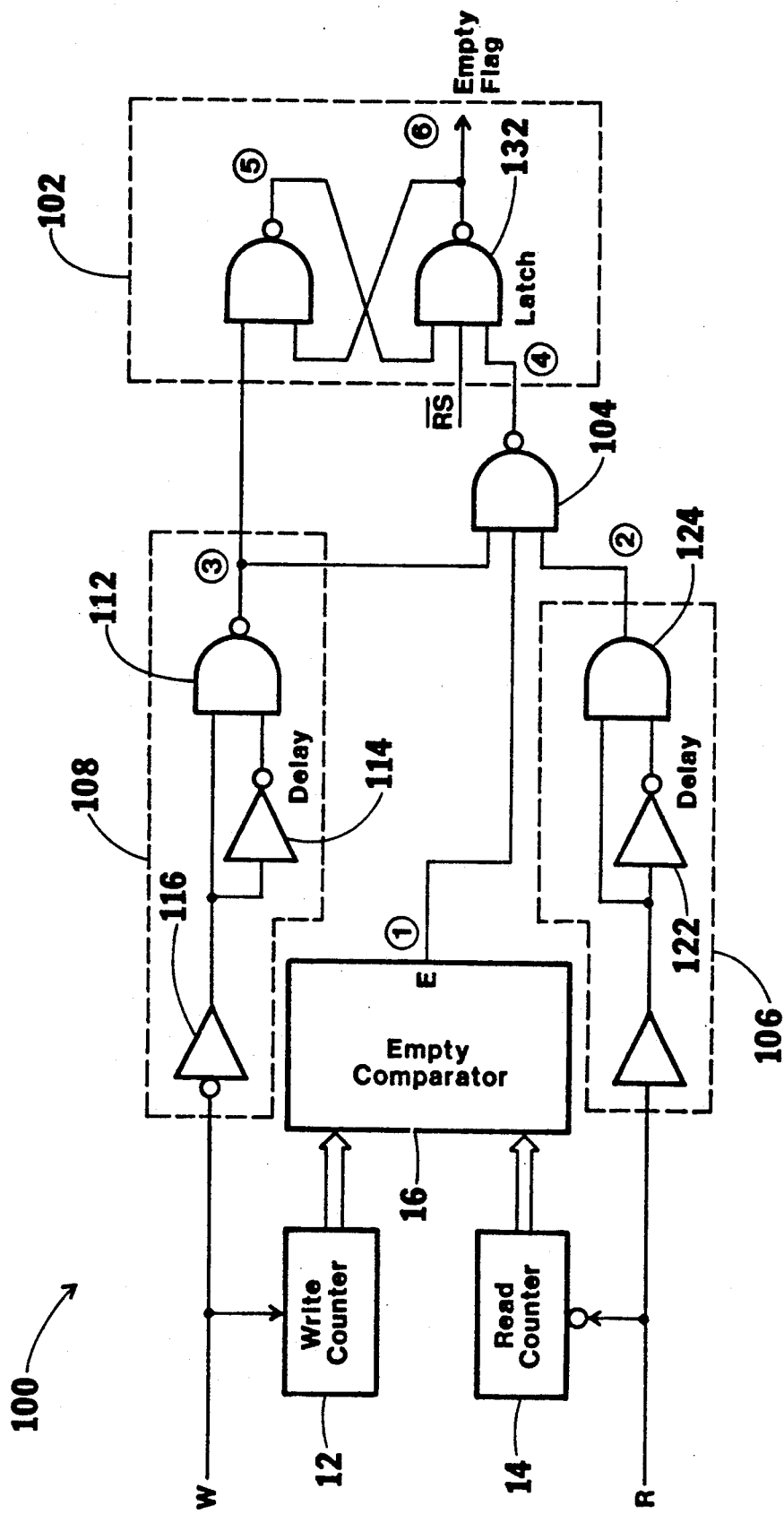
Fig.—2(a).

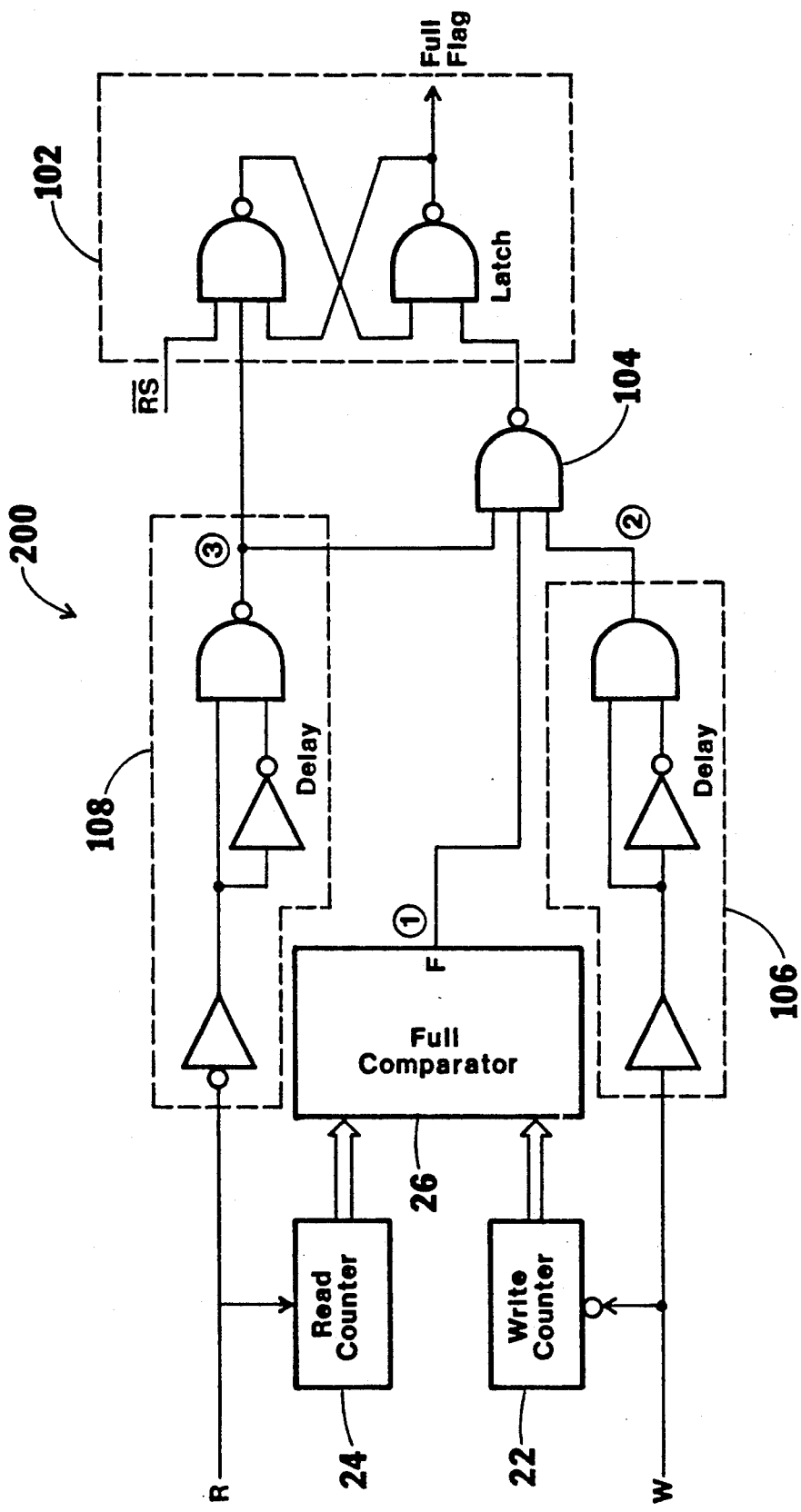
Fig.—2(b).

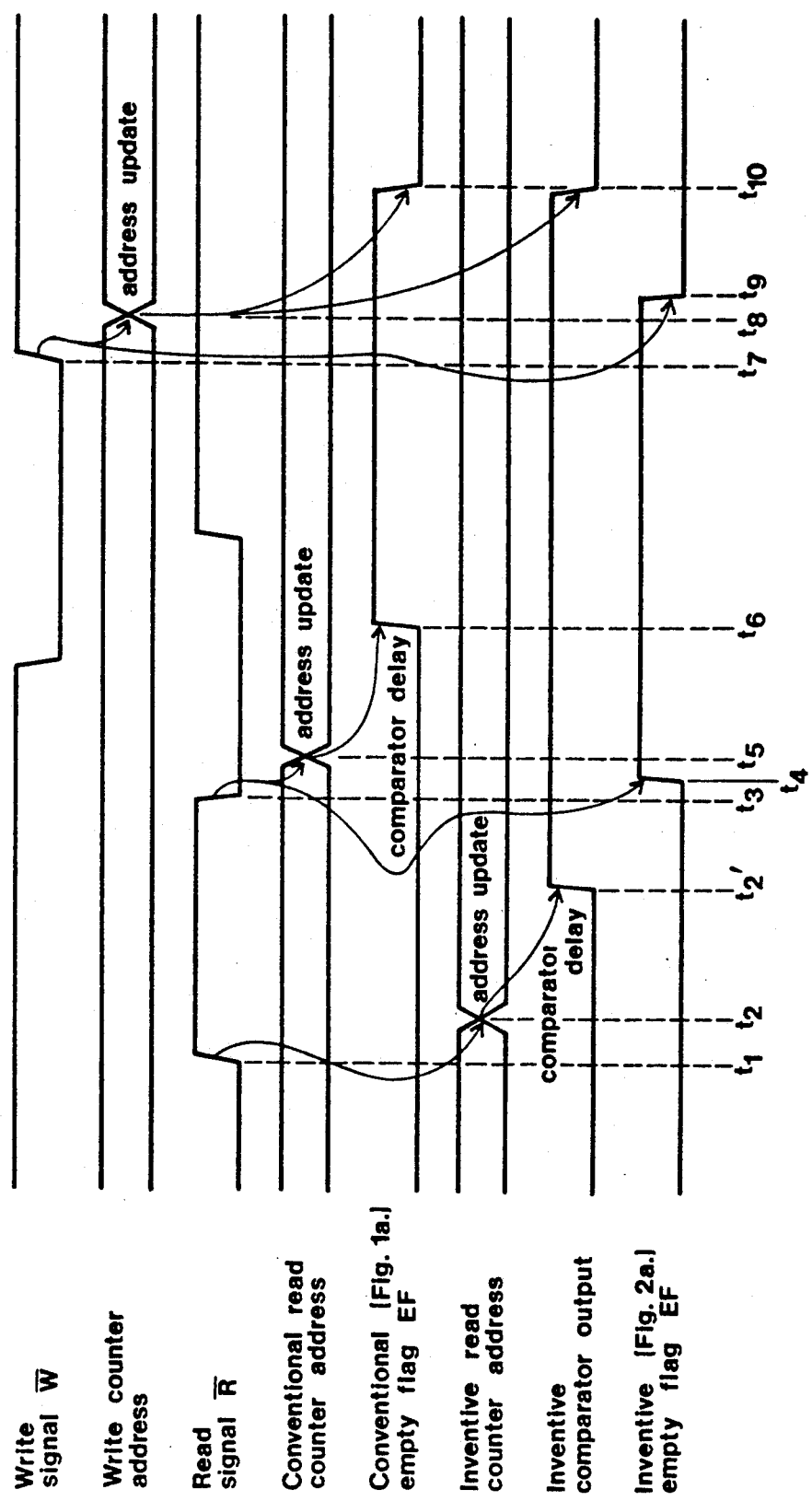
Fig. — 3.

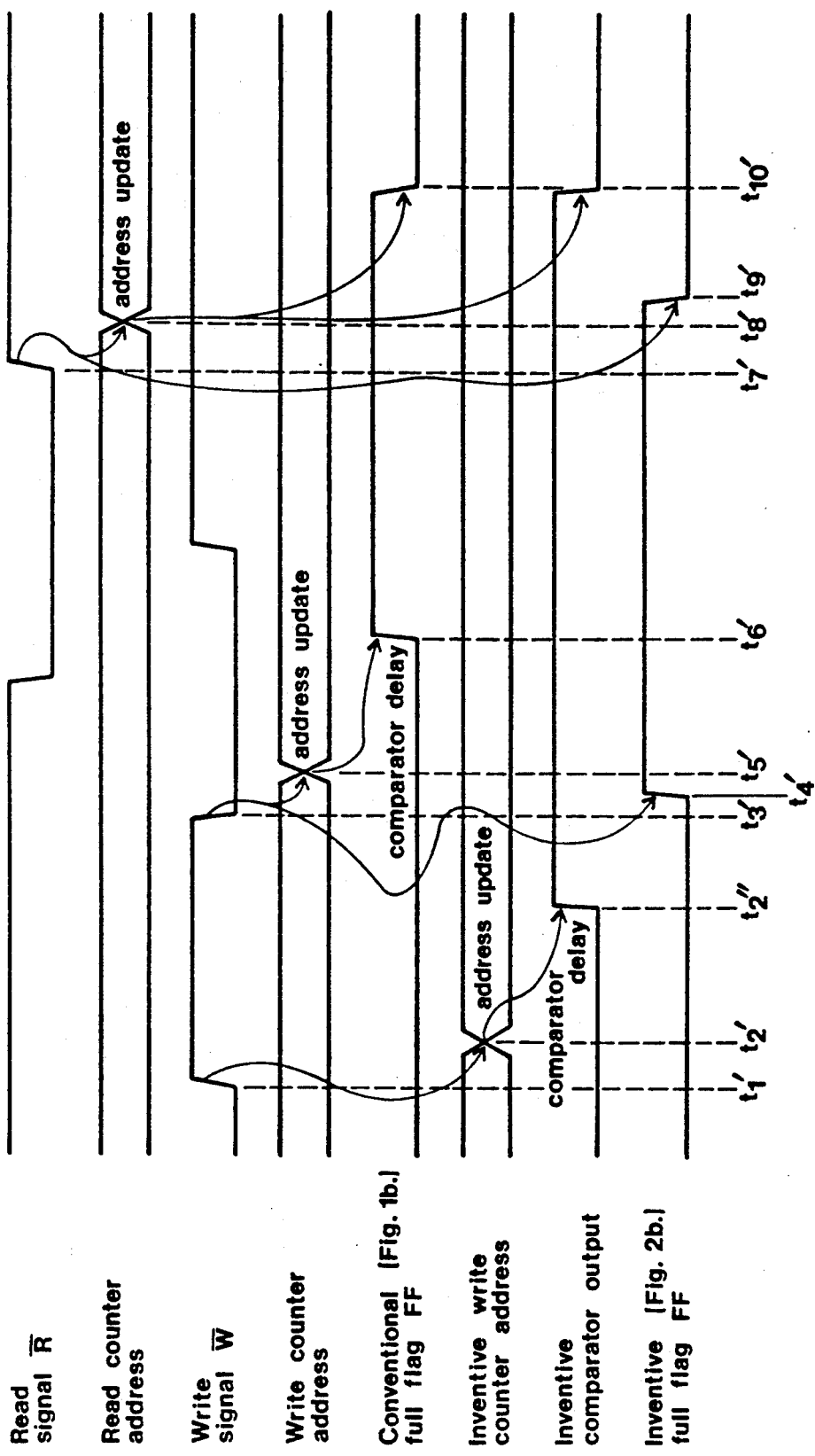

HIGH SPEED FULL AND EMPTY FLAG GENERATORS FOR FIRST-IN FIRST-OUT MEMORY

BACKGROUND OF THE INVENTION

This invention relates in general to first-in first-out memory (FIFO) and in particular to high speed full and empty flag generators for FIFOs. The invention is particularly useful for integrated circuit memory devices.

A conventional FIFO includes generators for generating full and empty flag signals. An empty flag generator in a conventional FIFO includes a write counter and a read counter for counting the number of times data has been written into or read from the FIFO. The generator also includes a comparator for comparing the output of the two counters in order to determine whether the FIFO is empty or not. Many FIFOs employ counters with 10 bits or more. Thus the comparator would have to compare twenty or more inputs at the same time and is therefore slow. The conventional full flag generator has a similar structure. Thus the full and empty flag generators in conventional FIFOs are generally slow.

The full and empty flag signals are critical information for FIFO users. It is therefore preferable to provide for FIFOs full and empty flag generators that are faster than those in conventional FIFOs.

SUMMARY OF THE INVENTION

Full and empty flag generators are operated by means of read and write signals. A read signal and a write signal each has read cycles, each cycle having two edges. The second occurring edge in the read or write signal is usually used for generating the empty or full flag and is referred to below as the flag generating edge. In conventional FIFOs, the read and write counters respond to the flag generating edge in updating the outputs to the comparator. The significant amount of time that a comparator takes to compare the updated counter outputs slows down the FIFO access considerably.

This invention is based on the observation that the flag generating process can be sped up significantly if the counter updating is triggered not by the flag generating edge of the read or write signal but by the preceding edge of the read or write signal. The comparator will then have time to compare the counter outputs and generate an updated output before the flag generating edge. At the onset of the flag generating edge, such updated output of the comparator is then provided as the empty or full flag. In this manner, even though the comparator is slow, the flag signal is generated after the flag generating edge with little delay, thereby reducing the flag time of the FIFO.

The empty flag generator of this invention generates a flag signal to indicate whether a FIFO is empty in response to a read signal and a write signal. The read signal has read cycles and in each cycle, a flag generating edge and an edge preceding the flag generating edge. The generator comprises read counter means responsive to the read signal for generating an output to indicate the number of times data has been read from the FIFO. The read counter changes its count in response to the read signal at the preceding edge. The generator includes a write counter means responsive to the write signal for generating an output to indicate the number of times data has been written into the memory, and includes comparator means for comparing the output of the read and write counter means to provide an output indicating the comparison. In this manner, the comparator means output is updated to indicate the comparison before the flag generating edge. The generator further includes means responsive to the read signal upon the onset of the flag generating edge for providing the comparator means output as the empty flag signal.

The full flag generator of this invention is for generating a flag signal to indicate whether a FIFO memory is full in response to a write signal. The write signal has write cycles and in each write cycle, a flag generating edge and an edge preceding the flag generating edge. The generator includes write counter means responsive to the write signal for generating an output to indicate the number of times data has been written into the memory. The write counter means changes its count in response to the write signal at the preceding edge. The generator also includes read counter means responsive to a read signal for generating an output to indicate the number of times data has been read from the memory, and includes comparator means for comparing the outputs of the read and write counter means to provide an output indicating the comparison. In this manner, the comparator means output is updated to indicate the comparison before the flag generating edge. The generator further includes means responsive to the write signal upon the onset of the flag generating edge for providing the comparator means output as the full flag signal.

In a conventional empty flag generator, after a valid write operation, the write counter is updated and the comparator compares the read and write counters in order to update its output. Thus if the FIFO is empty before the completion of a write operation, the output of the comparator is high to indicate an empty FIFO. After the completion of the first valid write operation, the write counter is updated so that the output of the comparator is changed from high to low. This also causes the empty flag to be switched from high to low, indicating a non-empty FIFO. This way for resetting the empty flag signal requires the completion of the comparison in the slow comparator and slows down the generator.

According to another aspect of the invention, a separate control means is provided which updates the empty flag signal to indicate a non-empty FIFO in response to a write signal. This aspect of the invention is directed towards an empty flag generator for first-in first-out memory for generating a flag signal to indicate whether the memory is empty in response to a read signal and a write signal. The generator comprises read counter means responsive to the read signal for generating an output to indicate the number of times data has been read from the memory, write counter means responsive to the write signal for generating an output to indicate the number of times data has been written into the memory. The generator also comprises comparator means for comparing the output of the read and write counter means to provide an output indicating the comparison and means responsive to the read signal for providing the comparator means output as the flag signal. The generator further includes means responsive to the write signal for controlling the providing means and for causing the flag signal to indicate a non-empty memory.

Such aspect of the invention is also directed towards a full flag generator for first-in first-out memory for generating a flag signal to indicate whether the memory is full in response to a read signal and a write signal. The generator comprises the same read counter means, write counter means, and comparator means of the same empty flag generator according to this same aspect of the invention. The full flag generator further comprises means responsive to the write signal for providing the comparator means output as the flag signal and means responsive to the read signal for controlling the providing means and for causing the flag signal to indicate a non-full memory.

BRIEF DESCRIPTION OF THE DRAWINGS

FIGS. 1a, 1b are block diagrams of conventional empty and full flag generators respectively.

FIGS. 2a, 2b are circuit diagrams of an empty flag generator and of a full flag generator respectively to illustrate the preferred embodiment of the invention.

FIG. 3 is a timing diagram illustrating the relative timing in updating the read and write counters in FIGS. 1a, 2a and the generation of the empty flag signals in reference to the read and write cycles to illustrate the relative speed performance of a conventional empty flag generator and an empty flag generator in accordance with the invention.

FIG. 4 is a timing diagram illustrating the relative timing in updating the write and read counters in FIGS. 1b, 2b and the generation of the full flag signals in reference to the write and read cycles to illustrate the relative speed performance of a conventional full flag generator and an full flag generator in accordance with the invention.

DETAILED DESCRIPTION OF THE INVENTION

FIG. 3 is a timing diagram illustrating the relative timing in updating the read counter in the empty flag generators in FIGS. 1a, 2a, and the generation of the empty flag signals in their respective empty flag generators. As shown in FIG. 3, a cycle of the inverted read signal $\overline{R}$ has a rising edge at time t1 and a subsequent falling edge at time t3. The second occurring edge (in this case the falling edge), at time t3 is the edge that causes an empty flag signal to be generated when the FIFO is empty. In conventional empty flag generators such as that in FIG. 1a, this second occurring edge also triggers the read counter to update its count, not the preceding edge at time t1. Thus in the discussion below, the falling edge of the inverted read signal $\overline{R}$ at time t3 will be referred to as the flag generating edge and the rising edge at time t1 will be referred to below as the preceding edge, where both edges are within the same read cycle.

FIG. 1a is a block diagram of a conventional empty flag generator. Generator 10 includes a write counter 12, a read counter 14, and a comparator 16. The write and read counters 12, 14 would increment its count at the rising edge of the write and read signals respectively. In the convention of FIG. 3, the inverted read or $\overline{R}$ is shown. Thus read counter 14 would increment its count by one at the falling edge of the signal $\overline{R}$, such as at time t3 in FIG. 3. The read counter 14 will require some time to increment its count by one and to provide such updated count in its read address, such as at time t5. The empty comparator 16 would require a significant amount of time to compare the updated addresses of counters 12, 14 to provide the empty flag at a much later time, such as t6. In other words, an empty flag is provided only after a considerable amount of time has elapsed (t3-t6 in FIG. 3), which slows down the flag time of the FIFO which is undesirable.

Similarly, at end of a write operation, signal $\overline{W}$ switches from low to high at t7 in FIG. 3. This rising edge of $\overline{W}$ causes write counter 12 to increment its count and the updated output comes out at time t8. This updated address of counter 12 goes through the comparator 16 and causes the empty flag to become non-empty at time t10. Again, this procedure requires signal to go through the slow comparator and is thus slow.

The operation of the conventional full flag generator 20 in FIG. 1b is analogous to that of the conventional empty flag generator in FIG. 1a. Thus, in reference to FIG. 4, the write counter 22 increments its count by one upon the falling edge of the inverted write signal $\overline{W}$ at time t3'. The write address and read address provided by counters 22, 24 to comparator 26 are therefore updated at a later time t5' to account for the time required for the write counter to update its count. Comparator 26 then requires a significant amount of time to compare the outputs of the two counters and to provide a full flag signal at t6'. The timer relationships between W, the address update of the two counters and the full flag are similar to those illustrated in FIG. 3 for generator 10 in FIG. 1a. It is therefore desirable to provide empty and full flag in FIG. 4 generators which are faster than the conventional ones.

FIG. 2a is a circuit diagram of an empty flag generator to illustrate the preferred embodiment of the invention. To simplify the discussion, identical components in the FIGURES of this application are identified by the same numerals. Generator 100 includes a write counter 12, read counter 14, empty comparator 16, latch 102, gate 104, pulse generating circuit 106, and a control circuit 108. Generator 100 differs from generator 10 in that, instead of responding to the rising edge of the read signal R at time t3 (that is, the falling edge of the inverted read signal $\overline{R}$, also referred to as the edge generating edge), read counter 14 in generator 100 responds to the falling edge of the read signal R or the rising edge of the inverted read signal $\overline{R}$ (the preceding edge) at time t1 as shown in FIG. 3.

Thus at time t1, the inverted read signal rises, causing the read counter 14 to update its count, by incrementing its count by one. The updated address of the read counter 14 is available at time t2 shown in FIG. 3. At such point, the comparator 16 may update its output by comparing the updated outputs of counters 12, 14. The time duration between the rising edge (preceding edge) at time t1 and the falling edge (flag generating edge) at time t3 should be adequate for the read counter to update its count and for the comparator to do the comparison, so that the output of the empty comparator would become available before the flag generating edge (falling edge) of the inverted read signal at time t3. Thus a minimum time interval between the rising and falling edges of the inverted read signal within the same read cycle may be 10 nanoseconds. Read counter 14 may take up to 2 nanoseconds to update its address output. Comparator 16 may require 4 nanoseconds to perform the comparison of the counter outputs and to update its output at node E. Therefore, the updated output of the comparator E is available at time t2' which is before the occurrence of the flag generating edge at time t3 in FIG. 3. The stage is therefore set for providing the updated output of the comparator upon the onset of the flag generating edge to speed up the generation of the empty flag signal.

In reference to FIG. 2a and as explained below, the falling edge of the inverted read signal $\overline{R}$ would cause the pulse generating circuit 106 to generate a high pulse of value "1" in order to enable gate 104 to pass the output of comparator 116 to latch 102. During a read cycle, the write signal $\overline{W}$ can be switching, too. However, as long as the $\overline{W}$ signal in FIG. 2a does not switch from high to low, the output of pulse generator 108 stays at high state. This high state at node 3 enables both the NAND-gate 104 and the latch 102. If the $\overline{W}$ signal does switch from high to low, it means the FIFO has just completed a write cycle and the empty flag should be negated. This case will be discussed later.

When the FIFO is not empty, the empty flag signal at the output of latch 102 has been set to low or "0." During the read cycle for reading out the last data from the FIFO, the outputs of counters 12, 14 are equal so that comparator 16 will compare such outputs and provide at node 1 an updated high output at value "1". Thus the high pulse from circuit 106 will cause a low output at value "0" of gate 104 at node 4 to be applied to latch 102, and thereby forcing the empty flag signal at the output of latch 102 at node 6 to high, thereby asserting the empty flag signal.

Now assume that a write cycle ensues after the empty flag is asserted and when the FIFO is empty. At the end of each valid write cycle, the signal W switches from high to low ($\overline{W}$ switches from low to high), such as at time t7 in FIG. 3. This switching of the signal W causes circuit 108 to generate a low pulse at node 3 in a manner analogous to circuit 106 described below. This low pulse resets the latch 102 and forces its output at node 6 low to indicate that the FIFO is non-empty at time t9.

More than one valid consecutive write operations will write more than one data in the FIFO, causing the outputs of the two counters 12, 14 unequal. The empty flag has already been negated to non-empty at the end of the first valid write operation. If the outputs of the counters 12, 14 are not equal, the output of comparator 16 will be low, causing the output of gate 104 to be high and causing the latch 102 to hold its own state. Under this situation, a write cycle will negate the empty flag again which is already non-empty; and a read cycle will not change the high state at node 4 and leave the latch to hold its own non-empty state.

The timing of the assertion of the empty flag signal in FIG. 2a is illustrated in FIG. 3. As discussed above, at time t2', comparator 16 has already completed the comparison of the outputs of counters 12, 14. FIG. 3 illustrates the situation where during a read cycle reading out the last data from the FIFO so that the outputs of counters 12, 14 are equal. As discussed above, at time t2', the output of comparator 16 has been updated to high. At time t3, the inverted high). In reference to FIG. 2a, before time t3, the read signal $\overline{R}$ is low so that the input of inverter 122 is low and the output of the inverter is high. Hence at a time immediately before t3, the output of AND-gate 124 at node 3 is low. This forces the output of gate 104 at node 4 high and prevents the output of the comparator 16 at node 1 to be passed by the gate 104. At time t3, the input of inverter 122 goes high whereas the output of inverter 122 remains high for a brief moment until the high input value forces the output of inverter 122 low at a time after t3. However, at t3 the other input of AND-gate 124 goes high, so that for a brief moment, both inputs of the AND-gate 124 are high. This generates a pulse of value "1" at the output node 2 of pulse generating circuit 106. This pulse permits the output of comparator 16 at node 1 to pass through gate 104 as described above. Therefore, upon the onset of the flag generating edge of the read signal at time t3, circuit 106 generates a pulse causing gate 104 to pass the output of comparator 16.

As discussed above, node 1 is high, at time t3' in FIG. 3, and the output of circuit 106 goes high so that the output of gate 104 at node 4 is forced low which in turn forces the empty flag signal at node 6 to be high. The empty flag signal therefore rises high at time t4 as shown in FIG. 3, The delay between t3 and t4 is therefore the time required for circuit 106 to generate the pulse in response to the flag generating edge of the read signal and the propagation times through gate 104 and latch 102.

From the above, it is evident that generator 100 requires only several gate delays (circuit 106, gate 104 and latch 102) to generate an empty flag signal in response to the flag generating edge of the read signal. Thus the time required to generate this empty flag signal is much shorter in generator 100 compared to generator 10 of FIG. 1a. As illustrated in FIG. 3, in the case of generator 10, the generator must first update the address outputs of counters 12, 14 and then wait for the slow comparator to complete its comparison before the empty flag signal can be generated. For the example given above, the comparator delay can easily take up to 4 nanoseconds and the address update up to 2 nanoseconds for a total of 6 nanosecond delay. In comparison, the time required for generator 100 to assert the empty flag signal is of the order of 2 nanoseconds after the flag generating edge.

In the same vein, after a valid write operation in a write cycle, generator 100 requires only several gate delays (circuit 108 and latch 102) to cause the empty flag signal to fall low, indicating a non-empty FIFO. Thus the time required to change the state of the empty flag signal is much shorter in generator 100 compared to generator 10 of FIG. 1a. As illustrated in FIG. 3, in the case of generator 10, the generator must first update the address output at counter 12 and then wait for the slow comparator 16 to complete its comparison before the empty flag signal can be changed to indicate a non-empty FIFO. For the example given above, the comparator delay can easily take up to 4 nanoseconds and the address update up to 2 nanoseconds for a total of 6 nanosecond delay. In comparison, the time required for generator 100 to change the value of the empty flag signal after a valid write operation is of the order of 2 nanoseconds after the flag generating edge.

Upon system initiation, the latch 102 is set to empty by reset signal $\overline{RS}$, and the write counter 12 is set to "0" whereas the read counter 14 is set to "1" so that the counter values are not equal even though the FIFO is empty upon initiation. After 1 byte of data is written into the FIFO, the value of flag counter is updated to "1," and the latch 102 is reset to non-empty by the low pulse generator 108. Therefore, if there is only one byte of data in the FIFO, the write counter 12 and read counter 14 have the same output value and hence the comparator 16's output E becomes "1," while the latch 102 still shows non-empty. If the next operation is a read cycle, $\overline{R}$ goes from high to low at t3 so that a high pulse at node 2 will be generated by circuit 106 at the $\overline{R}$'s falling edge, and thus the value "1" at E will pass through gate 104 and set latch 102 to empty.

Pulse generating circuit 108 generates a low pulse of value "0" at each high to low transition of its input. At the end of each valid write operation, the signal W switches from high to low (e,ovs/W/ switches from low to high) at t7 and thus causes circuit 108 to generate a low pulse at node 3, this low pulse resets the latch and forces its output low to indicate that the FIFO is non-empty at t9. This low pulse is also fed into NAND-gate 104 to prevent the E signal from being passed to the latch at the same time. Therefore, at each completion of a write operation, the flag is reset to non-empty. This flag generating procedure does not go through write counter and comparator as in conventional design and is much faster.

FIG. 2b is a circuit diagram of a full flag generator to illustrate a preferred embodiment of the invention. The construction of full flag generator 200 is almost exactly the same as the empty flag generator 100 of FIG. 2a, except that the positions of the read and write signal inputs and of the read and write counters are reversed. As known to those skilled in the art, the read and write counters each has an extra bit to determine whether the FIFO is full or empty when the remaining bits of the two counters are of equal values. The system reset signal is applied to a NAND-gate in the latch that is different from the case of generator 100 100, 200 of FIGS. 2a, 2b are the same. Thus as in the case of FIG. 2a, for generator 200 of FIG. 2b, at the preceding edge of the write cycle when the FIFO is half cycle away from full, the output values of the two counters will be equal causing the comparator 26 to provide a high output. Pulse generating circuit 106 will again provide a high pulse in response to the flag generating edge following the preceding edge of the write signal to pass such high value of the comparator to gate 104. Gate 104 in turn inverts the comparator output and forces the latch 102 output high. The relative timing between the flag generating edge of the write signal, at time t3', its preceding edge at time t1', the updating of the address values of the counters at time t2", and the assertion of the full flag signal at time t4' are all as illustrated in FIG. 4. FIG. 4 also illustrates the relative timing of the address update, the comparator delay and the assertion of the full flag signal for the conventional full flag generator of FIG. 1b. FIG. 4 therefore also illustrates the advantages of generator 200 of FIG. 2b over that of the conventional full flag generator. As in the case of the empty flag generator, control circuit 108 resets latch 102 output to low during a read cycle and prevents gate 104 from passing the comparator output during such reset. Also as in the case of the empty flag generator, control circuit 108 resets the full flag signal at the output of latch 102 to low after a valid read cycle so that the reset process does not require signals to pass through the slow comparator 26. As illustrated in FiG. 4, the resetting of the full flag signal to non-full is accomplished during the time interval t7'-t9', where the resetting of the full flag signal is delayed only by the gates in circuit 108 and latch 102. This is in contrast to the conventional full generator of FIG. 1b, where the reset of the full flag signal is delayed by the slow comparator to a time t10'. Latch 102 may also be reset by a system reset RS in the same manner as generator 100.

The invention has been described above by reference to the preferred embodiments. It will be understood that various modifications may be made without departing from the scope of the invention which is to be limited only by the appended claims.

What is claimed is:

1. An empty flag generator for a first-in first-out memory for generating a flag signal to indicate whether the memory is empty in response to a read signal and a write signal, said generator comprising:
   read counter means responsive to the read signal for generating an output to indicate the number of times data has been read from the memory;
   write counter means responsive to the write signal for generating an output to indicate the number of times data has been written into the memory;
   comparator means for comparing the outputs of the read and write counter means to provide an output indicating the comparison;
   reset signal generating means responsive to the write signal for generating a first set signal; and
   an R-S latch having a first input, a second input, and an output, wherein said first input receives the reset signal, said second input receives the first set signal, and said output provides the flag signal.

2. The generator of claim 1, wherein said set signal generating means comprises:
   pulse generating means responsive to the read signal for generating a pulse signal; and
   override means responsive to the pulse signal, the output of the comparator, and the reset signal for generating the first set signal, wherein the first set signal thus generated does not set the R-S latch when the reset signal is active.

3. The generator of claim 2, wherein said override means comprises a first NAND-gate having a first input, a second input, a third input, and an output, wherein said first input receives the pulse signal generated by the pulse generating means, said second input receives the output of the comparator means, said third input receives the reset signal, and said output provides the first set signal.

4. The generator of claim 2, wherein said pulse generating means comprises:
   first inverter means for receiving the read signal, and generating a delayed, inverted read signal in response thereof; and
   an AND-gate having a first input, a second input, and an output, wherein said first input receives the read signal, said second input receives the delayed, inverted read signal generated by said first inverter means, and said output provides the pulse signal.

5. The generator of claim 1, wherein said reset signal generating means comprises:
   second inverter means for receiving the write signal, and generating an inverted write signal in response thereof;
   third inverter means for receiving the inverted write signal generated by said second inverter means, and generating a delayed non-inverted write signal in response thereof; and
   a second NAND-gate having a first input, second input, and an output, wherein said first input receives the inverted write signal generated by the second inverter means, said second input receives the delayed, non-inverted write signal generated by the third inverter means, and said output provides the first reset signal.

6. The generator of claim 1, wherein said R-S latch also has a third input for receiving a second set signal.

7. The generator of claim 1, wherein said write counter means comprises a write counter and said read counter means comprises a read counter, and said write counter and said read counter are initially set such that an initial setting of said read counter is one count higher than an initial setting of said write counter.

8. A full flag generator for a first-in first-out memory for generating a flag signal to indicate whether the memory is full in response to a read signal and a write signal, said generator comprising:

write counter means responsive to the write signal for generating an output to indicate the number of times data has been written into the memory;

read counter means responsive to the read signal for generating an output to indicate the number of times data has been read from the memory;

comparator means for comparing the outputs of the read and write counter means to provide an output indicating the comparison;

reset signal generating means responsive to the read signal for generating a first reset signal;

set signal generating means responsive to the write signal, the output of the comparator means, and the first reset signal for generating a set signal; and an R-S latch having a first input, a second input, and an output, wherein said first input receives the first reset signal, said second input receives the set signal, and said output provides the flag signal.

9. The generator of claim 8, wherein said set signal generating means comprises:

pulse generating means responsive to the write signal for generating a pulse signal; and override means responsive to the pulse signal, the output of the comparator, and the first reset signal for generating the set signal, wherein the set signal thus generated does not set the R-S latch when the first reset signal is active.

10. The generator of claim 9, wherein said override means comprises a first NAND-gate having a first input, a second input, a third input, and an output, wherein said first input receives the pulse signal generated by the pulse generating means, said second input receives the output of the comparator means, said third input receives the first reset signal, and said output provides the set signal.

11. The generator of claim 9, wherein said pulse generating means comprises:

first inverter means for receiving the write signal, generating a delayed, inverted write signal in response thereof; and an AND-gate having a first input, a second input, and an output, wherein said first input receives the write signal, said second input receives the delayed, inverted write signal generated by said first inverter means, and said output provides the pulse signal.

12. The generator of claim 8, wherein said reset signal generating means comprises:

second inverter means for receiving the read signal, and generating an inverted read signal in response thereof;

third inverter means for receiving the inverted read signal generated by said second inverter means, and generating a delayed, non-inverted read signal in response thereof; and a second NAND-gate having a first input, second input, and an output, wherein said first input receives the inverted read signal generated by the second inverter means, said second input receives the delayed, non-inverted read signal generated by the third inverter means, and said output provides the first reset signal.

13. The generator of claim 8, wherein said R-S latch also has a third input for receiving a second reset signal.

* * * * *

UNITED STATES PATENT AND TRADEMARK OFFICE
CERTIFICATE OF CORRECTION

PATENT NO. : 5,311,475
DATED : May 10, 1994
INVENTOR(S) : Samson X. Huang

It is certified that error appears in the above-indentified patent and that said Letters Patent is hereby corrected as shown below:

In Column 8, line 16 in Claim 1:
```
    replace "signal for generating a first set signal; and"
    with:

--signal for generating a reset signal;
set signal generating means responsive to the read signal, the
    output of the comparator means, and the reset signal for
    generating a first set signal; and--
```

Signed and Sealed this

Eighteenth Day of October, 1994

Attest:

BRUCE LEHMAN

Attesting Officer      Commissioner of Patents and Trademarks